United States Patent
Hardy

(10) Patent No.: US 8,711,440 B2
(45) Date of Patent: Apr. 29, 2014

(54) METHOD OF PRODUCING PROBABILITIES OF BEING A TEMPLATE SHAPE

(75) Inventor: Stephen James Hardy, West Pymble (AU)

(73) Assignee: Canon Kabushiki Kaisha, Tokyo (JP)

( * ) Notice: Subject to any disclaimer, the term of this patent is extended or adjusted under 35 U.S.C. 154(b) by 1203 days.

(21) Appl. No.: 12/616,017

(22) Filed: Nov. 10, 2009

(65) Prior Publication Data

US 2010/0161637 A1   Jun. 24, 2010

(30) Foreign Application Priority Data

Dec. 18, 2008 (AU) .............................. 2008259730

(51) Int. Cl.
*G06F 17/30* (2006.01)
*H04N 1/40* (2006.01)

(52) U.S. Cl.
USPC ........... 358/448; 358/462; 358/474; 358/488; 358/505; 358/403; 382/176; 382/177; 707/758

(58) Field of Classification Search
USPC ........................ 358/448, 462, 474; 707/758
See application file for complete search history.

(56) References Cited

U.S. PATENT DOCUMENTS

| | | | | |
|---|---|---|---|---|
| 5,159,667 A | * | 10/1992 | Borrey et al. | ............ 715/205 |
| 5,387,930 A | * | 2/1995 | Toh | ............ 348/222.1 |
| 7,539,354 B2 | | 5/2009 | Hardy et al. | |
| 2006/0262962 A1 | | 11/2006 | Hull et al. | |
| 2007/0053005 A1 | | 3/2007 | Cowburn | |

OTHER PUBLICATIONS

Australian Examiners Report dated Oct. 8, 2010 in corresponding Australian Application No. 2008259730.

* cited by examiner

*Primary Examiner* — Quang N Vo
(74) *Attorney, Agent, or Firm* — Fitzpatrick, Cella, Harper & Scinto

(57) ABSTRACT

A method of identifying a printed page from a scan of the printed page is disclosed. The method comprises the steps of generating a page key of the printed page on the basis of the scan (710), searching a database (199) for a similar page key (730). For each found similar page key (740), the method further comprises; retrieving from the database an instance key location (750), generating an instance key for the printed page (530), based on the retrieved instance key location of the referenced page instance; and comparing the generated instance key for the printed page with the retrieved instance key of the referenced page instance (770). A match between the instance keys indicates that the printed page is the referenced page instance.

20 Claims, 12 Drawing Sheets

Document ID

Original location

Original owner

Original PDL

Page Data

- Page 1
    - Document page key
    - Instance key location
    - Instance key
- Page 2
    - Document page key
    - Instance key location
    - Instance key
- ...

FIG. 6

METHOD OF PRODUCING PROBABILITIES OF BEING A TEMPLATE SHAPE

CROSS-REFERENCE TO RELATED PATENT APPLICATIONS

This application claims the right of priority under 35 U.S.C. §119 based on Australian Patent Application No. 2008259730, filed Dec. 18, 2008, which is incorporated by reference herein in its entirety as if fully set forth herein.

TECHNICAL FIELD

The current disclosure relates to a method for identifying a page instance of a source document from a scan of the page instance.

BACKGROUND

Printing and copying paper documents plays a central role in the dissemination of information in the office environment. Managing and maintaining the organization of paper documents and their relationship to their digital counterparts is becoming increasingly difficult due to the explosion in the number of documents and the number of people simultaneously working on them.

A number of methods of improving the management of this complexity exist that are based on maintaining a database of relationships between digital versions of a document and their paper representations. When such a database exists, upon identifying a document, a copying device may query the database for the digital version of the document and execute a number of different options based on the original description of the document. Such options may include reprinting from the original of the document or printing an updated version of the document, if such has been registered with the database.

One method of maintaining a database of the relationships between digital versions of a document and their paper representations is based on printing a machine readable mark on the document, such as a bar code, that identifies the document that has been printed. This method has the disadvantage that it requires special marks on the document. These marks can be visually distracting. In addition, the printing of such marks may require special inks or papers, thereby increasing the cost of the system.

Another method of maintaining a database of the relationships between digital versions of a document and their paper representations is based on image indexing. In this method, a distinct property of the document is stored in the database. The property can be recovered from a scan or image of the document and can distinguish the document from other documents. The Fourier magnitude of a thumbnail of a document is a known example of such a property. One disadvantage of this method is that the method cannot discriminate between documents that share similar image content. Another disadvantage is that similar images can be confused, if extraneous marks have been added to the document, either by annotation, or by wear and tear of the paper on which the document is printed.

A further method of maintaining a database of the relationships between digital versions of a document and their paper representations is based on extracting a unique property of the medium on which the print is being made. An example of such a unique property is the image of the fibre structure of a section of the surface of the paper, or any other printing medium on which the document has been printed. A disadvantage of this method is that it requires a fixed portion of the document to be left largely unprinted, thereby restricting the acceptable geometry of the source document. Such a restriction is displeasing to the user and reduces the utility of the method.

SUMMARY

According to a first aspect of the present disclosure, there is provided a method for identifying a printed page from a scan of the printed page. The method generates a page key of the printed page on the basis of the scan and sends the generated page key to a database to initiate a search for a similar page key. For each similar page key retrieved from the database, the method then retrieves from the database an instance key location for a page instance with the respective similar page key, generates an instance key for the printed page, based on the retrieved instance key location of the respective page instance, and sends the generated instance key for the printed page to the database for comparison with an instance key of the respective page instance. A match between the instance keys indicates that the printed page is the respective page instance.

According to a second aspect of the present disclosure, there is provided method for identifying a page instance of a source document from a scan of the page instance. The scan is obtained from a print of the page instance, with the print being effected by a printing device on a physical medium. The method is typically executed by a processed in a computer and finds at least one image in a database that is similar to the scanned image of the printed page instance. The similarity is based on a first physical characteristic in the scan, the characteristic being substantially invariant between different printed instances of the source document. The method then, for each of the at least one similar images, determines a location in the scan based on information associated with the respective similar image, obtains a second characteristic from the scan, the second characteristics being positioned in said location, wherein the second characteristic is substantially variant between different instances of said source document, and compares the second characteristic of the page instance with a corresponding second characteristics of the respective similar image. A match between the second characteristics indicates that the respective similar image is a source document for the printed page instance.

According to a third aspect of the present disclosure, there is provided a computer-system implemented method for identifying a printed page. The method scans a plurality of first printed pages to generate a first scan of each first printed page and the generates a page key and an instance key for each first printed page on the basis of its respective first scan. The generated page key and an instance key for each first page are then stored in a database. An unidentified printed page is then scanned to generate a scan image of the unidentified page and, on the basis of the scan of the unidentified page, a page key of the unidentified printed page is generated. The method then sends the generated page key to a database to initiate a search for a similar page key to the page key of the unidentified page. For each retrieved similar page key, the method then retrieves from the database an instance key location for a first page with the respective similar page key, generates an instance key for the unidentified printed page, based on the retrieved instance key location of the respective first page, and sends the generated instance key for the unidentified printed page to the database for comparison with an instance key of the respective first page. A match between the instance keys indicates that the unidentified printed page is identical to the respective first printed page.

According to further aspects of the present disclosure, there is provided a system and a computer readable storage medium for implementing any one of the aforementioned methods.

Other aspects of the invention are also disclosed.

BRIEF DESCRIPTION OF THE DRAWINGS

At least one embodiment of the present invention will now be described with reference to the drawings, in which:

FIG. 6 shows reference data included in an entry in a document database for a single document;

DETAILED DESCRIPTION INCLUDING BEST MODE

It is to be noted that any discussions relating to prior art arrangements relate to discussions of documents or devices which form public knowledge through their respective publication and/or use. Such should not be interpreted as a representation by the present inventor(s) or the patent applicant that such documents or devices in any way form part of the common general knowledge in the art.

A method for identifying a printed page from a scan of the page will be disclosed below with reference to FIGS. 1 to 11. In more generic terms, the describe method is also a method for identifying a printed instance of a source document from a scan of the printed instance. The method is described in terms of an office workflow environment, however other configurations and arrangements are also possible and some of these will be noted throughout the description.

Figure 1A:
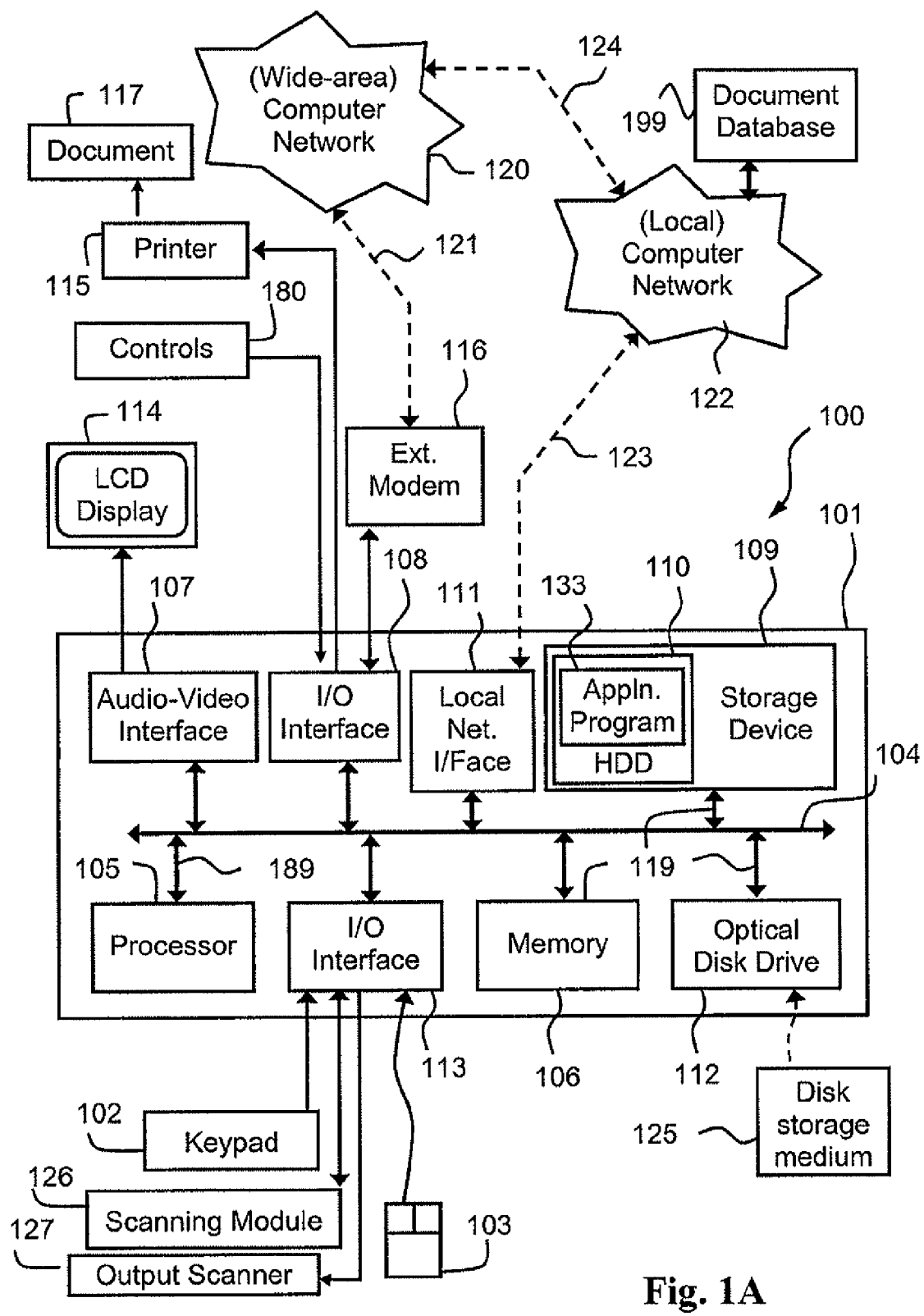
FIGS. 1A and 1B show a schematic block diagram of a digital photocopying system upon which at least some of the steps of the described method for identifying a printed page from a scan of the printed page can be practiced.
Figure 1B:
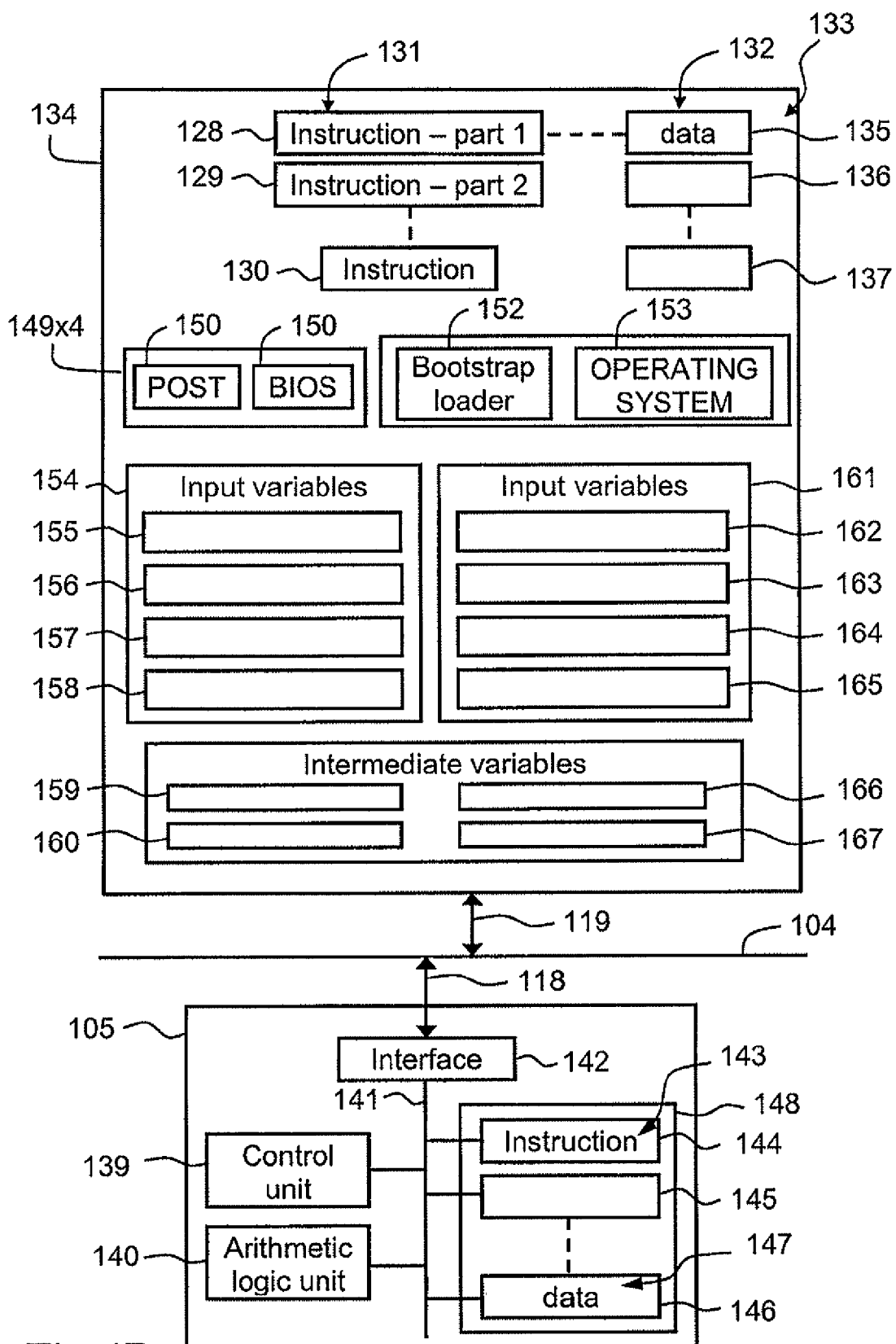

FIGS. 1A and 1B collectively form a schematic block diagram of a photocopying system 100, upon which the disclosed method and other related methods can be practiced. The digital photocopying system 100 is used to print documents and register the documents in an associated database 199, as seen in FIG. 1A.

As shown in FIG. 1A, the photocopying system 100 is formed by a computer module 101, input devices such as a keypad 102, a mouse pointer device 103 (optional). A scanning module 126 is used for receiving paper as input and for digitising any images formed on the paper into an electronic format. Photocopying system 100 also includes output devices such as an LCD display device 114 and a printer 115. Notably, the photocopying system 100 can operate as a printer (including a networked printer), a scanner or a photocopier. In the printer operational mode, the photocopying system 100 uses printer 115 to print documents without scanning them first. The metadata for the printed documents in this case is obtained either from a local memory storage device (109 or 125) or from one of networks 122 or 120, via the respective interface 111 or 108.

An output scanner module 127 is used for scanning the pages once they are printed. The output scanner module 127 is not a standard option on a digital photocopier and represents an addition to the digital photocopier hardware that enables the described embodiment of the present method. This scanner 127 is positioned in the photocopying system 100 at the output tray of the device and scans each page after it has been printed, but before it has been provided to the user via the output tray. This scanner can be implemented in a variety of different ways. In the described embodiment of the present method the scanner is a Contact Image Sensor (CIS) type scanner illuminated by a bank of LEDs. While in the described embodiment the scanner is integrated with the printer, this is not strictly necessary for the execution of the present method, and it would be possible for this output scanner to be a separate device. Alternatively, a user may take the output of a printer/digital photocopier and place it on the standard scanner integrated with the digital photocopier.

An external Modulator-Demodulator (Modem) transceiver device 116 may be used by the computer module 101 for communicating to and from a communications network 120 via a connection 121. The network 120 may be a wide-area network (WAN), such as the Internet or a private WAN. Where the connection 121 is a telephone line, the modem 116 may be a traditional "dial-up" modem. Alternatively, where the connection 121 is a high capacity (eg: cable) connection, the modem 116 may be a broadband modem. A wireless modem may also be used for wireless connection to the network 120.

The computer module 101 typically includes at least one processor unit 105, and a memory unit 106, for example formed from semiconductor random access memory (RAM) and semiconductor read only memory (ROM). The module 101 also includes an number of input/output (I/O) interfaces including an audio-video interface 107 that couples to the video display 114, optional loudspeakers and microphone, an I/O interface 113 for the keypad 102, optional mouse 103 and an interface 108 for the external modem 116 and printer 115. In some implementations, the modem 116 may be incorporated within the computer module 101, for example within the interface 108. The computer module 101 also has a local network interface 111 which, via a connection 123, permits coupling of the photocopying system 100 to a local computer network 122, known as a Local Area Network (LAN). As also illustrated, the local network 122 may also couple to the wide network 120 via a connection 124, which would typically include a so-called "firewall" device or device of similar functionality. The interface 111 may be formed by an Ethernet™ circuit card, a Bluetooth™ wireless arrangement or an IEEE 802.11 wireless arrangement.

The interfaces 108 and 113 may afford either or both of serial and parallel connectivity, the former typically being implemented according to the Universal Serial Bus (USB) standards and having corresponding USB connectors (not illustrated). Storage devices 109 can also be provided, such as a hard disk drive (HDD) 110. Other storage devices may also be provided, such as a floppy disk drive and a magnetic tape drive (not illustrated), as well as an optical disk drive 112.

Portable memory devices, such optical disks (eg: CD-ROM, DVD), USB-RAM, and floppy disks for example may then be used as appropriate sources of data to the photocopying system 100.

The components 105 to 113 of the computer module 101 typically communicate via an interconnected bus 104 in a manner similar to a conventional mode of operation of a standard computer system known to those in the relevant art.

The described methods may be implemented using the photocopying system 100. In particular, the methods of FIGS. 4, 5, 7, 8, 10 and 11, to be described, may be implemented as one or more software application programs 133 executable within the computer module 101. In particular, the various disclosed steps and methods are effected by instructions 131 in the software 133 that are carried out within the computer module 101. The software instructions 131 may be formed as one or more code modules, each for performing one or more particular tasks. The software may also be divided into two separate parts, in which a first part and the corresponding code modules performs the various steps and methods and a second part and the corresponding code modules manage a user interface between the first part and the user.

The software 133 is generally loaded into the computer module 101 from a computer readable medium, and is then typically stored in the HDD 110, as illustrated in FIG. 1A, or the memory 106. After loading, the software 133 can be executed by the computer module 101. In some instances, the application programs 133 may be supplied to the user encoded on one or more CD-ROM 125 and read via the corresponding drive 112 prior to storage in the memory 110 or 106. Alternatively the software 133 may be read by the photocopying system 100 from the networks 120 or 122 or loaded into the computer module 101 from other computer readable media. Computer readable storage media refers to any storage medium that participates in providing instructions and/or data to the computer system 100 for execution and/or processing. Examples of such storage media include floppy disks, magnetic tape, CD-ROM, a hard disk drive, a ROM or integrated circuit, USB memory, a magneto-optical disk, or a computer readable card such as a PCMCIA card and the like, whether or not such devices are internal or external of the computer module 101. Examples of computer readable transmission media that may also participate in the provision of software, application programs, instructions and/or data to the computer module 101 include radio or infra-red transmission channels as well as a network connection to another computer or networked device, and the Internet or Intranets including e-mail transmissions and information recorded on Websites and the like.

The second part of the application programs 133 and the corresponding code modules mentioned above may be executed to implement one or more graphical user interfaces (GUIs) to be rendered or otherwise represented upon the display 114. Through manipulation of typically the keyboard 102 and the mouse 103, a user of the photocopying system 100 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 117 and user voice commands input via the microphone 180.

FIG. 1B is a detailed schematic block diagram of the processor 105 and a "memory" 134. The memory 134 represents a logical aggregation of all the memory devices (including the HDD 110 and semiconductor memory 106) that can be accessed by the computer module 101 in FIG. 1A.

When the computer module 101 is initially powered up, a power-on self-test (POST) program 150 executes. The POST program 150 is typically stored in a ROM 149 of the semiconductor memory 106. A program permanently stored in a hardware device such as the ROM 149 is sometimes referred to as firmware. The POST program 150 examines hardware within the computer module 101 to ensure proper functioning, and typically checks the processor 105, the memory (109, 106), and a basic input-output systems software (BIOS) module 151, also typically stored in the ROM 149, for correct operation. Once the POST program 150 has run successfully, the BIOS 151 activates the hard disk drive 110. Activation of the hard disk drive 110 causes a bootstrap loader program 152 that is resident on the hard disk drive 110 to execute via the processor 105. This loads an operating system 153 into the RAM memory 106 upon which the operating system 153 commences operation. The operating system 153 is a system level application, executable by the processor 105, to fulfil various high level functions, including processor management, memory management, device management, storage management, software application interface, and generic user interface.

The operating system 153 manages the memory (109, 106) in order to ensure that each process or application running on the computer module 101 has sufficient memory in which to execute without colliding with memory allocated to another process. Furthermore, the different types of memory available in the system 100 must be used properly so that each process can run effectively. Accordingly, the aggregated memory 134 is not intended to illustrate how particular segments of memory are allocated (unless otherwise stated), but rather to provide a general view of the memory accessible by the computer module 101 and how such is used.

The processor 105 includes a number of functional modules including a control unit 139, an arithmetic logic unit (ALU) 140, and a local or internal memory 148, sometimes called a cache memory. The cache memory 148 typically includes a number of storage registers 144-146 in a register section. One or more internal buses 141 functionally interconnect these functional modules. The processor 105 typically also has one or more interfaces 142 for communicating with external devices via the system bus 104, using a connection 118.

The application program 133 includes a sequence of instructions 131 that may include conditional branch and loop instructions. The program 133 may also include data 132 which is used in execution of the program 133. The instructions 131 and the data 132 are stored in memory locations 128-130 and 135-137 respectively. Depending upon the relative size of the instructions 231 and the memory locations 128-130, a particular instruction may be stored in a single memory location as depicted by the instruction shown in the memory location 130. Alternately, an instruction may be segmented into a number of parts each of which is stored in a separate memory location, as depicted by the instruction segments shown in the memory locations 128-129.

In general, the processor 105 is given a set of instructions which are executed therein. The processor 105 then waits for a subsequent input, to which it reacts to by executing another set of instructions. Each input may be provided from one or more of a number of sources, including data generated by one or more of the input devices 102, 103, data received from an external source across one of the networks 120, 122, data retrieved from one of the storage devices 106, 109 or data retrieved from a storage medium 125 inserted into the corresponding reader 112. The execution of a set of the instructions may in some cases result in output of data. Execution may also involve storing data or variables to the memory 134.

The disclosed data processing arrangements use input variables 154 that are stored in the memory 134 in corresponding memory locations 155-158. The data processing arrangements produce output variables 161 that are stored in the memory 134 in corresponding memory locations 162-165. Intermediate variables may be stored in memory locations 159, 160, 166 and 167.

The register section 144-146, the arithmetic logic unit (ALU) 140, and the control unit 139 of the processor 105 work together to perform sequences of micro-operations needed to perform "fetch, decode, and execute" cycles for every instruction in the instruction set making up the program 133. Each fetch, decode, and execute cycle comprises:

(a) a fetch operation, which fetches or reads an instruction 131 from a memory location 128;

(b) a decode operation in which the control unit 139 determines which instruction has been fetched; and (c) an execute operation in which the control unit 139 and/or the ALU 140 execute the instruction.

Thereafter, a further fetch, decode, and execute cycle for the next instruction may be executed. Similarly, a store cycle may be performed by which the control unit 139 stores or writes a value to a memory location 132.

Each step in the methods of FIGS. 4, 5, 7, 8, 10 and 11 is associated with one or more segments of the program 133, and is performed by the register section 144-147, the ALU 140, and the control unit 139 in the processor 105 working together to perform the fetch, decode, and execute cycles for every instruction in the instruction set for the noted segments of the program 133.

Alternatively, the currently disclosed method of identifying a printed instance of a source document from a scan of the printed instance may also be implemented in a general-type computer system. Examples of computers on which the described arrangements can be practised include IBM-PC's and compatibles, Sun Sparcstations, Apple Mac™ or alike computer systems evolved therefrom. The disclosed methods can also be performed on a dedicated hardware such as one or more integrated circuits performing the functions or sub functions of the above described arrangements. Such dedicated hardware may include graphic processors, digital signal processors, or one or more microprocessors and associated memories.

Having at their disposal the above described photocopying system 100, a user can print a document 117 by using the printer mode of the photocopying system 100. Before reaching the user, the printed document 117 is scanned by output scanner 127. This allows an electronic copy of the printed document 117 and a set of page keys (not shown) to be generated on the basis of the scan of the printed document 117. The document and the keys are then stored into a document database 199 associated with the system 100. It is possible for the document database 199 to be configured to run internally to the digital photocopying system 100. However, in the described embodiment, the document database 199 is implemented either on the local area network 122 or the wide area network 120, to which the photocopying system 100 has access.

The keys that are stored in the database 199 together with a copy of the document, are used for indexing each document 117. A combination of two keys is used. One key, referred to as a document page key, is generated on the basis of a spatial arrangement of printed marks, or a physical characteristic, that is captured by the scan and is usually representative of the content of the document. As such the page key is substantially invariant between different printed instances of the source document. Another key, known as the instance key, is generated either from the spatial arrangement of printed marks that vary substantially from print to print of the same document, or from a property of the print medium that varies substantially between each page of the medium. As such the instance key is substantially variant between different printed instances of the source document. Details of the various key generation methods are given further in the text.

The keys are used to identify a printed document when, at a later time, a user attempts to photocopy the document on a digital photocopying system, which may be the same or a different system from photocopying system 100. The respective photocopying system queries the document database 199 for information associated with the original print of the document. Once a document is identified, various options for copying are presented to the user based on the information retrieved from the document database.

Figure 2:
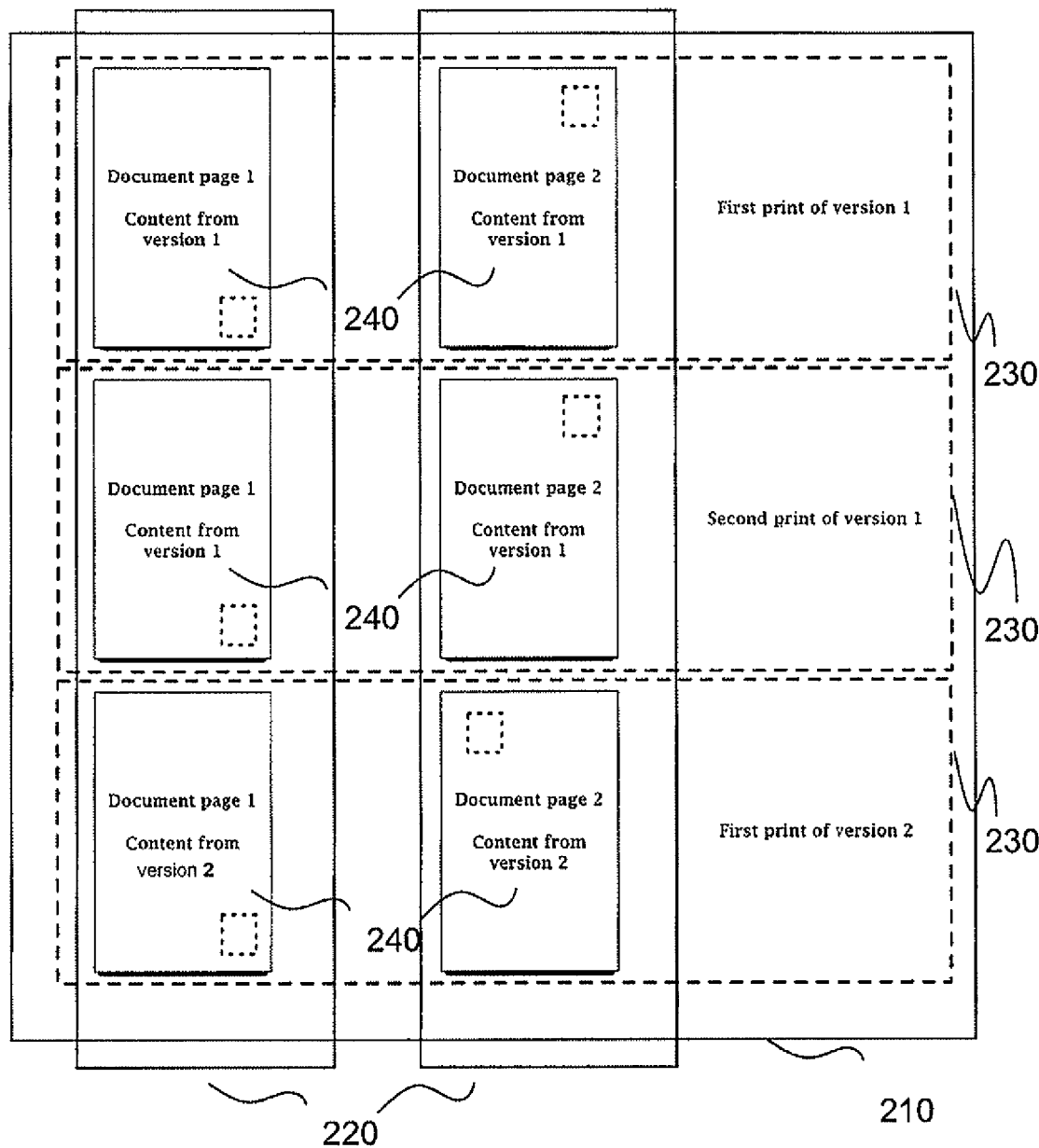
FIG. 2 shows a document with multiple pages, multiple prints and multiple versions.

To distinguish the different stages of the printed document lifecycle, some nomenclature is introduced with reference to FIG. 2. A document 210 consists of pages 220, which are logically related according to some purpose of the user. Typically, within a computer, a document will be related to a single source file. This is not always the case, as a user may sometimes merge two files together to make a third, with the intention of printing them as a single document, or may make a merged document, tailoring the document according to its recipient and the like. Documents may have several versions 230 of the same document. These revisions may be minor, such as changes in grammar, spelling or a fraction of the text. Alternatively, the revisions may be major and include substantial rewriting of the text of the document.

When a document is printed onto a physical medium, an instance of a page of a document 240 is created. Two instances may have the same logical content, i.e. they may contain the same content from the document, but they may be printed at different times or on different printing devices.

The disclosed method allows obtaining a scan of an instance 240 of a printed page and determining from which page 220, from which version 230 and of which document 210, the instance 240 was generated.

Figure 3:
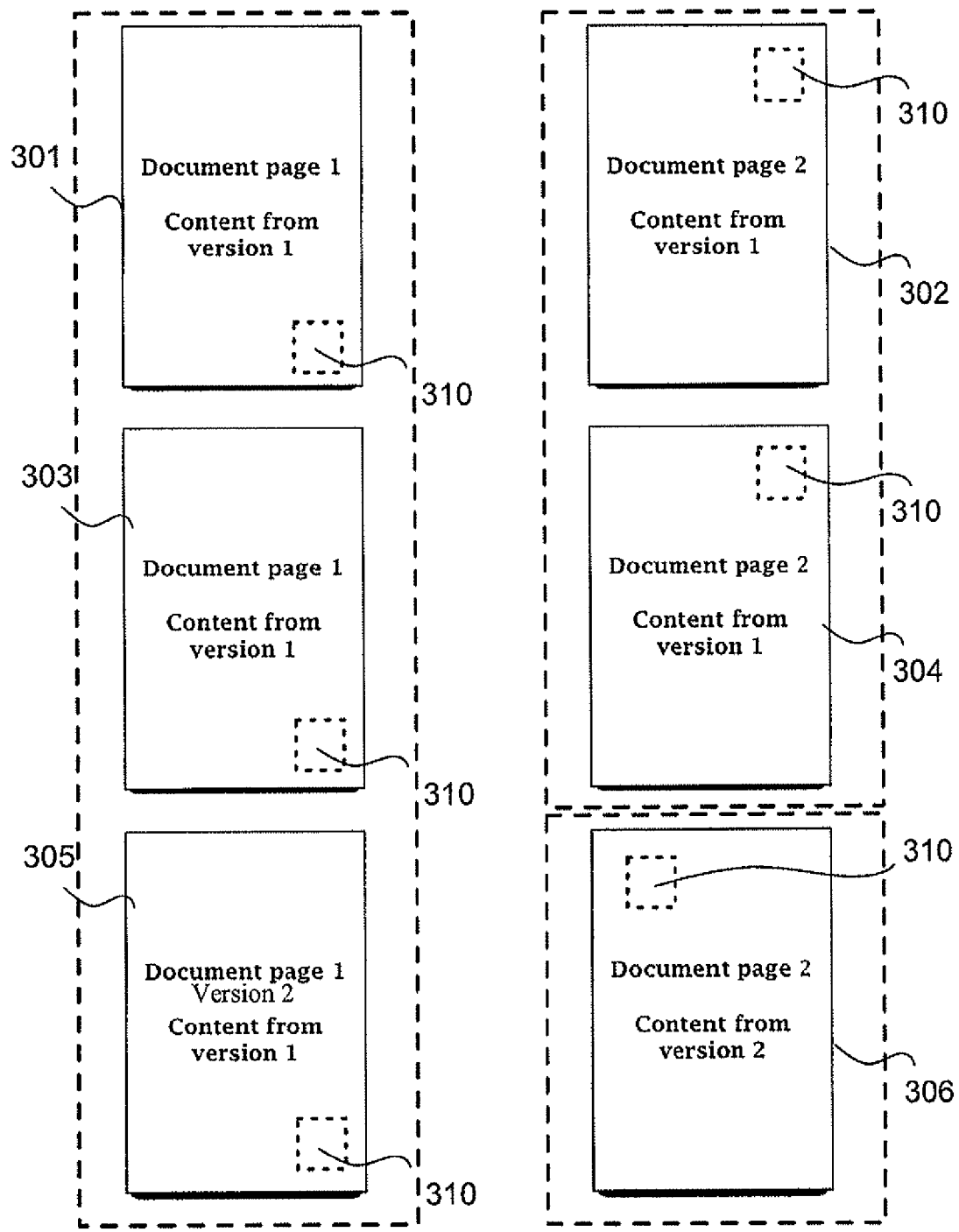
FIG. 3 shows changes of the location of an instance key between different versions of a given document.

The difficulty of this task is illustrated with respect to FIG. 3. Here, six instances 301 to 306 are printed from the pages of a two-page document, which has two versions. The first four instances 301 to 304 originate from two prints of the first version of the document. The last two instances 305 and 306 come from a print of the second version of the document. In this case, the first page of the document in version 1 and version 2 are identical in content. Based on the information from the document printed on each of the instances, the first pages 301, 303 and 305 of the prints will be considered identical as they come from the same digital data. The first two instances 302 and 304 of the second page will be considered identical, and the third instance 306 of the second page will be determined to come from the second version of the document as the content is distinct from the content of the second page of version 1. Based on just the information from the document printed on the third instance of the first page, it is impossible to determine that this page is part of the second version of the document.

To resolve this ambiguity, it is possible to look at properties that change from instance to instance of either the medium, on which the print is made, or of the print itself.

One example of a characteristic medium property is the fibre structure or the surface structure of the medium on which the instance is printed. Typically, these structures are highly unique to a local region of the medium and effectively distinguish each local area of each sheet of media. However, to examine this structure that varies from instance to instance, it is important that the particular section of the medium is not printed over. Given that a print may consist of large patches of solid colour that are arbitrarily located on the page, it is impossible to assume that the area of the medium to be examined will be located in the same position from print to print. If such an assumption is made, then it is necessary that the user does not print on that region in any document that is to be used with this system. This limits the utility of document indexing systems.

A second property that changes between printing instances is the microscopic variation of the distribution of the colorant used in the printing process, i.e. the toner in an electrophotographic printer or ink in an inkjet printer. In an electrophotographic printer, toner is deposited as a result of a number of physical processes that are subject to substantial noise or turbulence, such as toner transfer between different surfaces in the machine. This leads to small variations of the toner placement that are unique to each printout, even though the overall visual impression of two prints of the same material can be almost identical. Such variations are useful for discriminating between different instances of the same page. However, yet again, the area of the page that is best suited for use for discriminating between similar instances, is dependent on the document content.

To illustrate the document content dependence of the positions between instance discriminating information, a number of patches (not shown) have been identified in each page instance shown in FIG. 3. These patches are selected as regions that have characteristic variations that differ between instances and are positioned at what is known as the instance key location 310 of each particular page of a particular version of a document. So, for the first page in both versions of the document the instance key location 310 is in the lower right corner of the page. For the second page of the first version of the document, the instance key location 310 is in the top right corner of the page, and for the second page of the second version of the document, the instance key location 310 is in the top left corner of the document.

Figure 4:
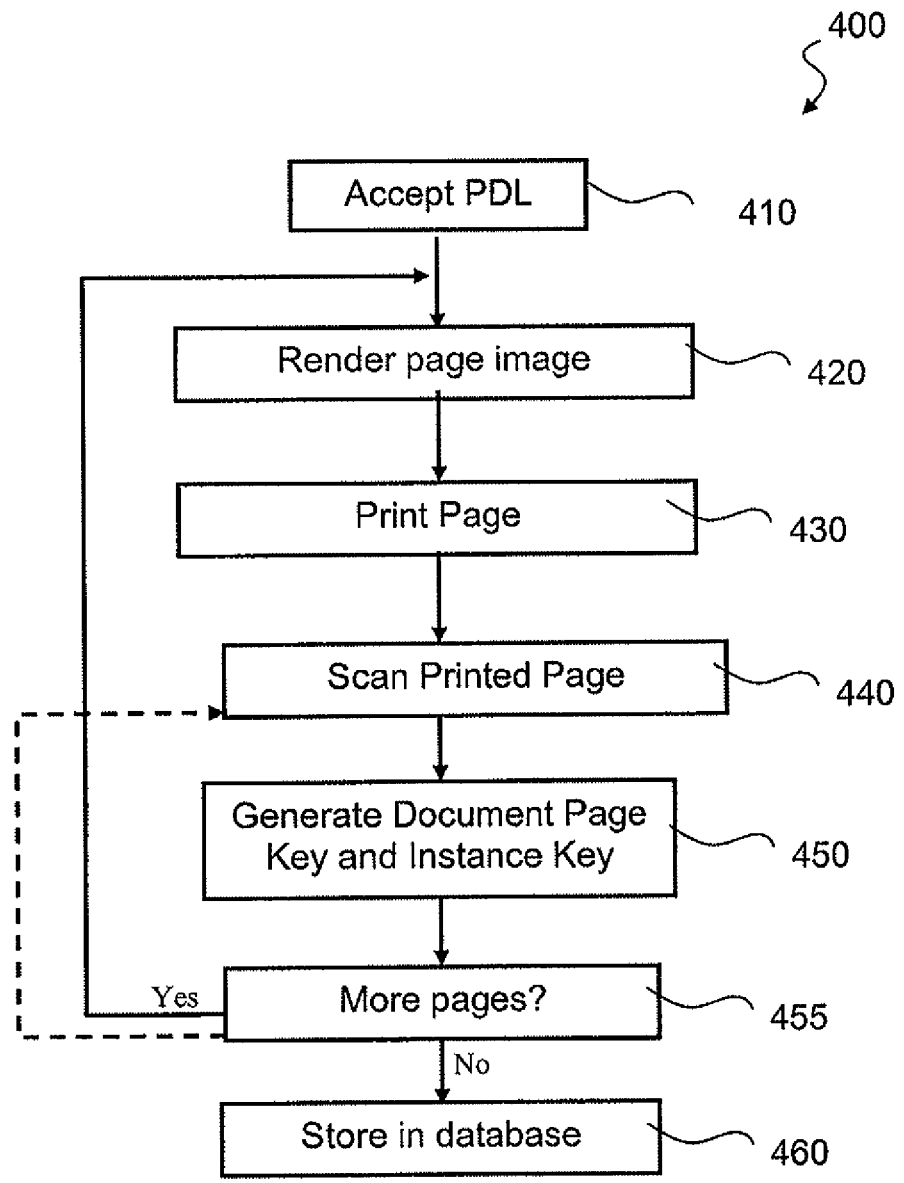
FIG. 4 shows a method of adding a page data to a database.

FIG. 4 shows a flow diagram of the method 400 of adding document data to database 199. The method 400 is executed when the user first prints a document and the document is added to the document database 199. The method starts with step 410, in which a job to be printed is sent to the digital photocopying system 100. The printing job is typically in the form of a page description language (PDL), such as Postscript™ or PDF. The processor 105 of the digital copier 100 is configured to render this document to a raster representation according to the instructions in the PDL. This is generally done on a page by page basis, so after step 410 the method enters a loop over each page in the document. For the page of the PDL currently being printed, in step 420, the processor 105 generates the raster representation used to drive the printing mechanism. In step 430, processor 105 drives printer 115 to print the respective page from this raster representation. In step 440, as the printed page exits the digital photocopying system, processor 105 drives output scanner 127 to scan the printed page. The output scanner 127 generates the image data which is used in step 450 by processor 105 for the generation of the two page keys, the document page key and the instance key. At stage 455, the processor 105 verifies if there are more pages to be printed. If this is the case—the method 400 returns back and performs step 420 with respect to the next page. If there are not more pages to be printed, the page keys and associated document metadata are stored in the database 199, in step 460.

In this described embodiment, the generated data that is stored in the database 199 in step 460, is related to pages that are printed locally by the photocopying system 100. However, this does not have to be the case and pages that are not printed locally can also be added to the database 199, In this case the method 400 would start at step 440 and proceed to scan more pages, as indicated with the dotted loop line.

The step 450 of generating the page keys from a scan of a printed page is now described in more detail with reference to FIG. 5. In the first step 510 of this method 450, processor 105 generates a document page key. In the described embodiment, the page key is obtained from the scan data, but it may also be generated from the original PDL, from the rendered raster representation of the page, or from any combination of the three. Next, in step 520, the scan data will be analysed by processor 105 to determine which region of the scan will be used for generation of the instance key. This region is called the instance key location 310. Again, in an alternative embodiment, instead of the scan data, the original PDL or the rendered raster representation of the page may be used to determine the instance key location. Similarly to the document page key, any combination of the above (the scan data, the original PDL and the rendered raster representation of the page), may also be used to determine the instance key location. Finally, in step 530, processor 105 generates the instance key from the scan data related to the instance key location. Steps 510 to 530 will be described in more detail further in the text.

The precise information that is stored in the database 199 in step 460 is application dependent. The reference data included in a single record entry in the document database 199, according to the described embodiment, is illustrated by FIG. 6. Thus, FIG. 6 represents a single record representing a particular document in the database 199. The document ID represents a unique identifier associated with each document. This identifier is linked to metadata that is related to the original document and is used to generate the printed document: data representing the location of the original document (Original Location), data representing the owner of the original document (Original Owner), and data representing the location of the original PDL (Original PDL). Other information, such as versioning information, may also be stored here. However, such information can generally be determined directly from the original document. In addition to these meta-data entries, the page keys corresponding to each of the pages that comprise the document are also stored. This page data consists of an entry for each page including the document page key, the instance key location and the instance key. Thus, the illustrated document data comprises references to, as well as the associated page key information of the instances of each page included in the document. Of course this information can be structured in different ways. For example, each page can be referenced independently from the document it is included in. In addition, the reference data shown in FIG. 6 can be split into two. For instance, the instance key location and the instance key can be saved in a separate location, with the document data in FIG. 6 only including reference to their location. Each of these records can be stored in the database 199, which in the described embodiment is a relational database, such as an SQLite database. Such database can be searched according to different fields in the database entry and allows retrieval of associated records. The searching mechanism for the database depends on the detailed nature of the document page keys and the instance keys.

Figure 7:
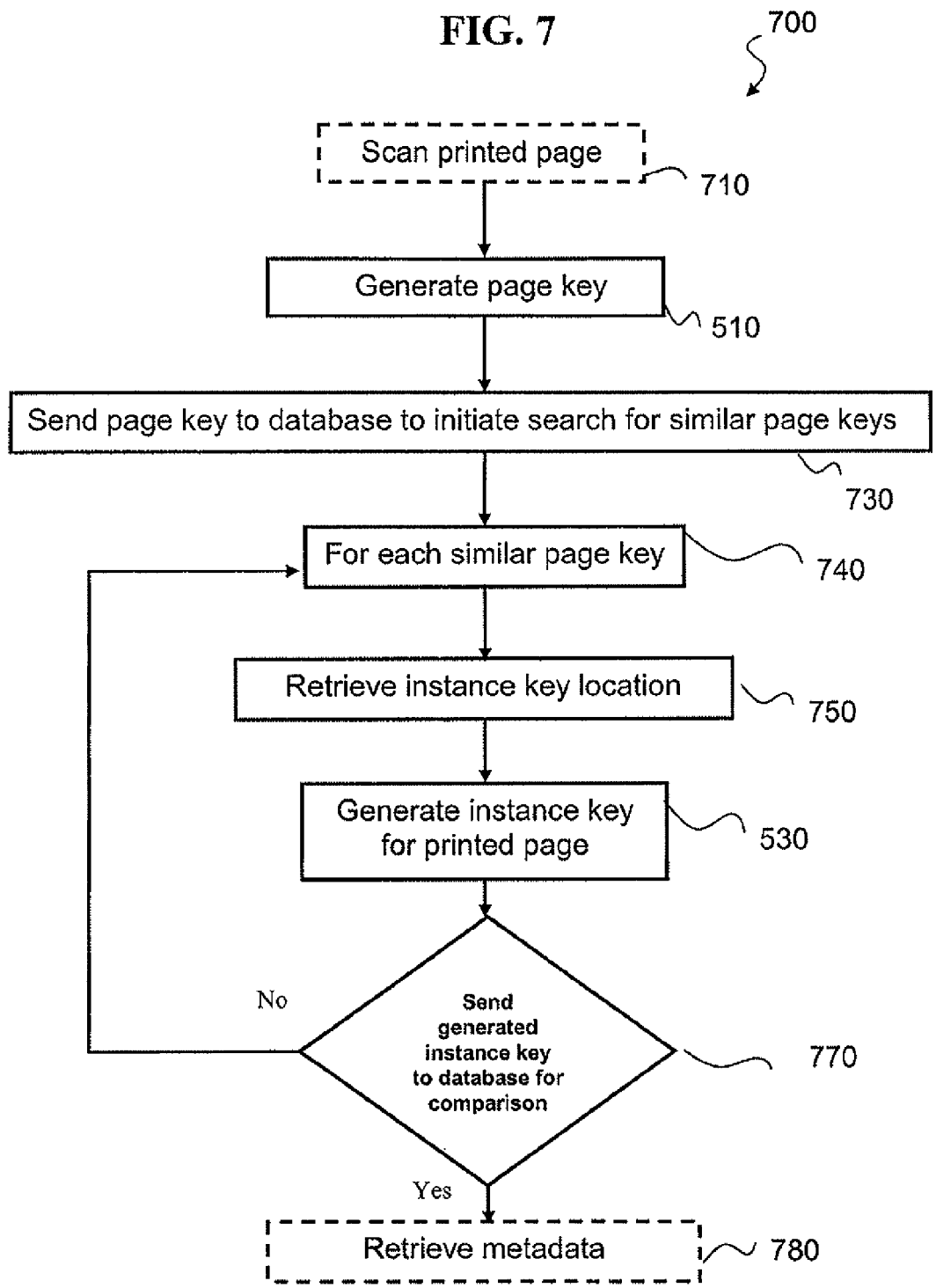
FIG. 7 is a block diagram of the method of identifying a printed page from a scan of the printed page.

The method 700 of identifying a printed page from a scan of the printed page is shown in FIG. 7. Using the scan of the unidentified printed page, effected on the digital photocopying system 100, the method 700 retrieves from the document database 199 a source document corresponding to the printed page, thus identifying the page.

The method 700 starts with step 710, in which the user places a document to be retrieved on the scanner of the photocopying system 100 and a scan is performed. It should, however, be noted that the scan does not have to be performed locally on photocopying system 100. Instead the scan indicated with step 710 may be performed on a separate, either local or remote, system, and the scan data forwarded or stored in database 199, or at different location, for processing. For this reason the step 710 is indicated with dotted line in FIG. 7.

The processor 105 uses the scan data obtained from scanning unit 126 to, in step 510, generate a document page key. In step 730, the processor 105 sends the generated document page key, via interface 108 or 111, to the document database 199, where a search is initiated for similar page keys. As a result of the performed search, a list of one or more pages with similar page keys is generated by the database 199. The degree of similarity depends of the type of key being used and will be described later in the text.

The document database 199 returns the pages, or the references to the pages, corresponding to the ten most similar document keys. At step 740 the processor 105 starts a loop that considers, in turn, each similar page or reference thereof, returned by the document database. In step 750, the processor 105 retrieves an instance key location of the respective similar page from the database 199. In step 530, the processor 105 uses the retrieved instance key location and the scan data from the printed page to generate an instance key for the scanned printed page. In step 770, the processor 105 sends this generated instance key to document database 199, where it is compared with the instance key of the respective page being processed by the loop. Alternatively, the instance key of the respective "similar" page can be retrieved from the database and compared with the instance key generated for the printed page by processor 105.

The choice of comparison method depends on the nature of the instance key and will be described later in the text. If the instance keys match, this indicates that the printed page is an instance of the respective page found on the database. In this case, the method may continue with an optional step 780, in which the metadata corresponding to the original document is retrieved from the document database.

Once the metadata of the matching document has been retrieved then a number of options may be presented to the user. These options include but are not limited to:

(i) reprinting from the original;
(ii) printing the latest version of the document, if different versions exist;
(iii) display of the document owner, creation date or other metadata;
(iv) display of the copy history of the document; or
(v) emailing or otherwise transferring the original document file to the user.

Alternatively, the data of the match can be used for other purposes, such as monitoring and statistics.

These options represent a substantial advantage over known prior art methods. For example, the present method can discriminate between both the document and the instance level simultaneously, without making restrictions on the format of the users documents. In particular, by combining the generality of image matching with the high reliability of document instance matching, the present method ensures that incorrect identification of documents is reduced.

If the instance keys do not match, and there are further similar documents to consider, then the method returns to step 740. If there are no further similar documents to consider, then the method 700 ends without finding the original document, corresponding to the scanned document, in the database.

Creating Document Image Key

Figure 8:
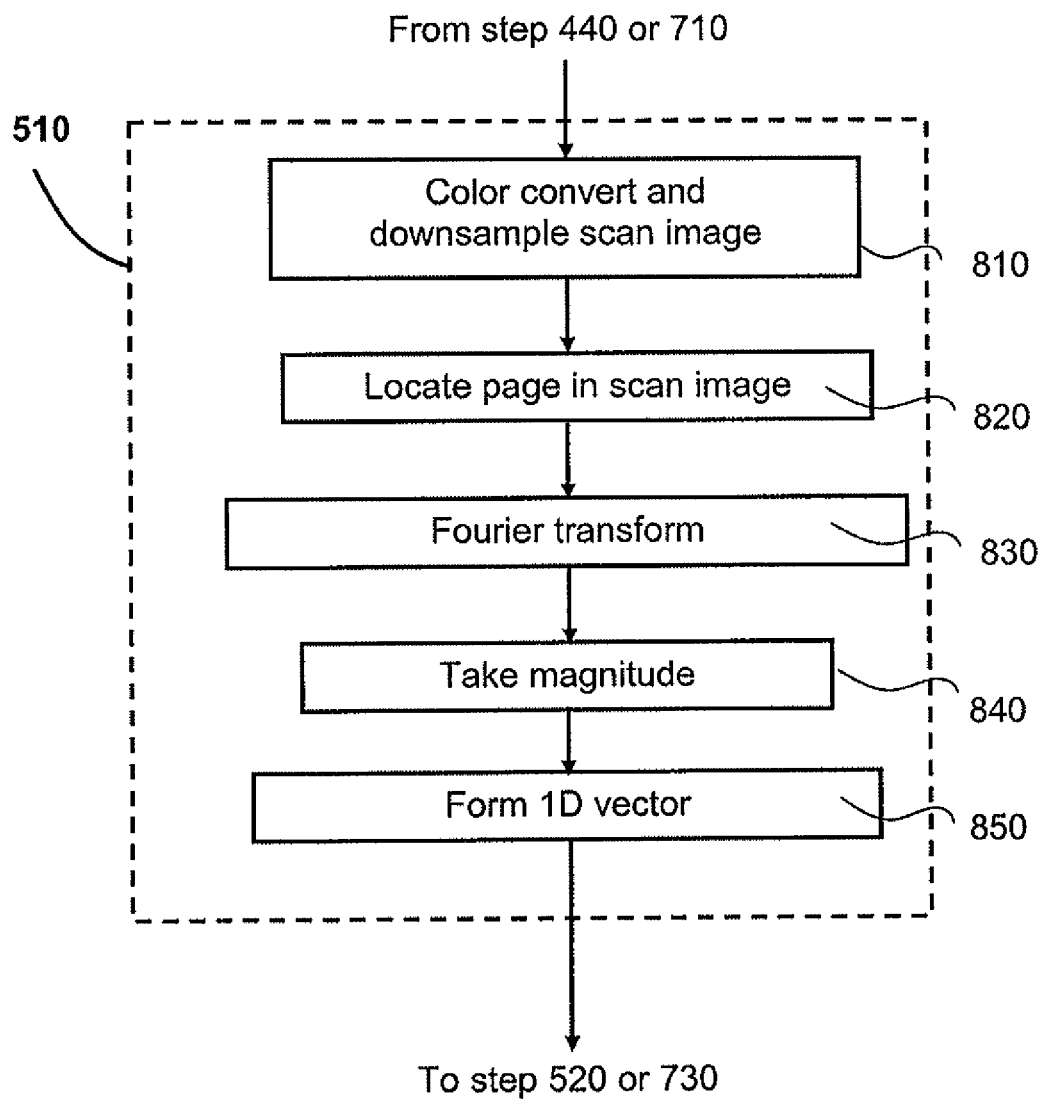
FIG. 8 is a block diagram showing a method of generating a page key from a scan of the page.

The sub-method 510 of FIG. 5 will now be described in more detail with reference to FIG. 8. The input to this sub-method is a scan of a print instance, such as the ones described in relation to steps 440 and 710. However, the input data may also be retrieved by way of a lookup from the database. Scan data is generally provided from a scanner interface as a set of RGB digital signals in raster order. The amount of data from a scanner, which typically operates at 600 dpi and has a width of around 12 inches, is typically 140 MB per second, for a printer operating at 60 pages per minute. Such a large amount of data must be substantially reduced to reduce the cost of the system and its operating time. So, the first step 810 in the sub-method 510 is for processor 105 to convert the input RGB data to grey scale through the equation:

$$Y=0.299R+0.587G+0.114B.$$

In addition, the colour converted data is down-sampled to 300 dpi, then 150 dpi, then 75 dpi, and then 37.5 dpi, by repeatedly convolving the image data both horizontally and vertically with a 3 tap Burt-Adelson filter, as is commonly known in the art. The 300 dpi representation is stored for later extraction of the instance key related image data. Other methods of colour conversion and down-sampling may be applied with similar efficacy. This step reduces the size of a single A4 scan to around 10 MB, uncompressed, for the 300 dpi data, and to an image of around 400 pixels by 300 pixels, for the 37.5 dpi version.

In the second step 820, the page is approximately located in the scan. This is typically done through a hardware-assisted process in the digital copier's scanning subsystem. If the scanner is a sheet feed type, then the leading edge of the paper is detected by an optical sensor and is available to the copier firmware subsystem after a scan. If the scanner is a platen type, the paper position is often detected using a short pre-scan and again is available from the copier firmware subsystem.

Figure 9:
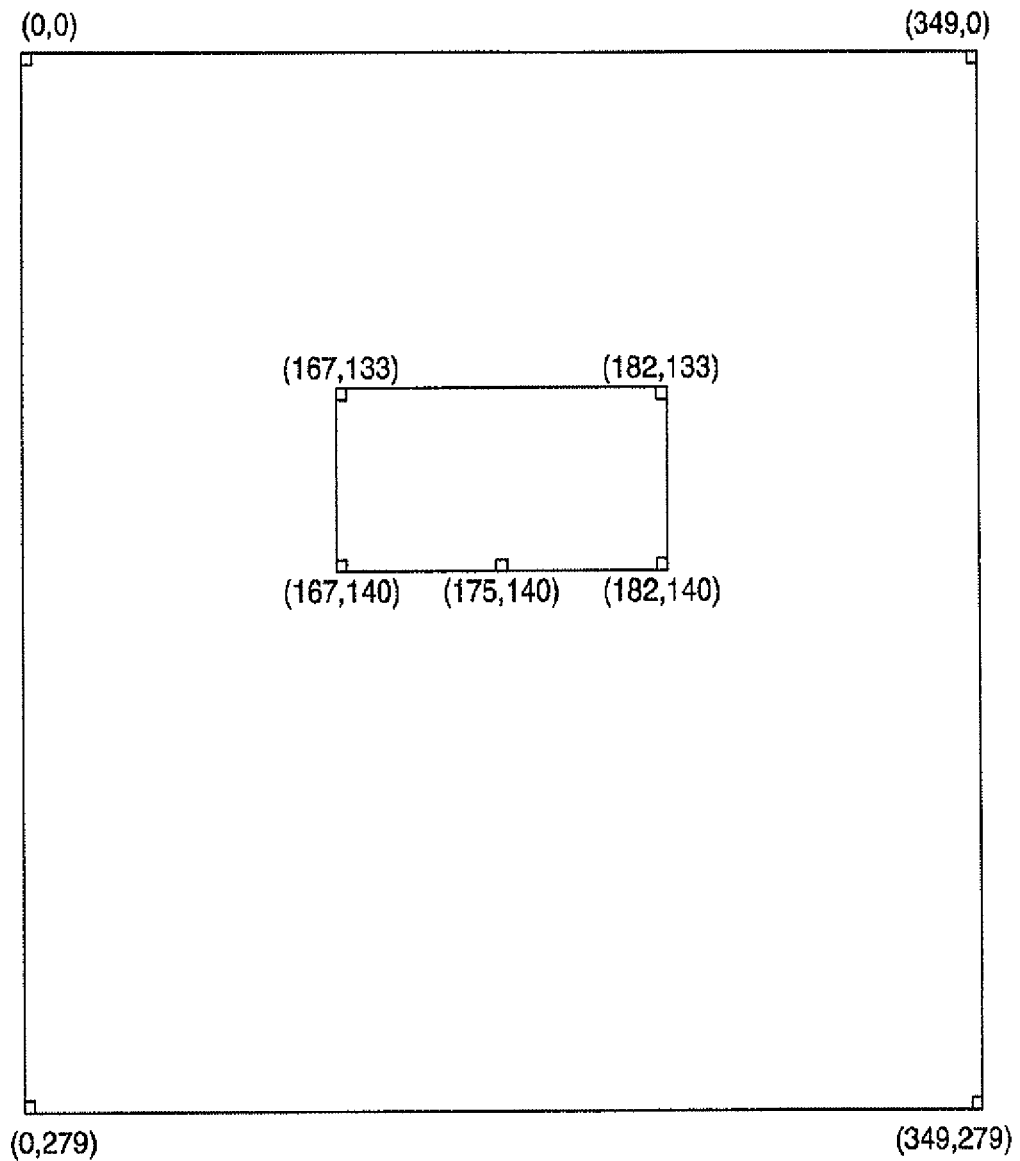
FIG. 9 shows a region of the Fourier transform of a down-sampled scan that is used to generate a page key.

In step 830, a 2D discrete Fourier transform of the rectangle enclosing the image of the document (from the 37.5 dpi resolution version of the document) is performed using the Fast Fourier Transform. This results in a 350 by 280 pixel Fourier image, each pixel of which is represented by a complex number. A 16×8 block of Fourier coefficients with positive vertical frequencies closest to the image mean (which is the DC value) is identified, as represented diagrammatically in FIG. 9 for an image size of 350 by 280 pixels. In step 840, the magnitude of each complex Fourier coefficient from that block is taken and used to, in step 850, form a 1D vector. It should be noted that the DC position of the FFT in FIG. 9 is located in the (175,140) pixel of the image. The formed 1D vector represents the document page key.

Returning now to FIG. 7, step 730 is described here in more detail. In this step, the document database is searched to find images that are similar in content to the image of the scanned document instance. To determine a list of similar documents, document page keys must be compared and ranked according to a similarity measure. If two document page keys are denoted $D_i^{(1)}$ and $D_i^{(2)}$ where the index i enumerates over the 128 elements of the document page key, then two keys can be compared using normalised correlation:

$$C = \frac{\sum_i D_i^{(1)} D_i^{(2)}}{\sqrt{\sum_i D_i^{(1)2}} \sqrt{\sum_i D_i^{(2)2}}}.$$

In the described embodiment, the document database compares the page key of the document to be searched for, to each other document page key in the database. As a result of this comparison, step 730 returns a list of possible matches that comprises the pages with the corresponding highest normalised correlation score.

The method 510, discussed above with reference to FIG. 8, is used for generating the document page key. The method generates a vector of 128 floating point numbers to represent each page of each document and can be used to determine a similar page of a document regardless of the type of content in the document, be it images, graphics or text. There are a number of other possible ways of forming the document page key known in the prior art, such as performing Optical Character Recognition (OCR) on the text of the scan to determine salient words or phrases in the document, and using this collection of salient words as a document page key. Alternately, other image based methods such as Fourier-Mellin descriptors, or SIFT (Scale-Invariant Feature Transform) features may also be used.

Figure 5:
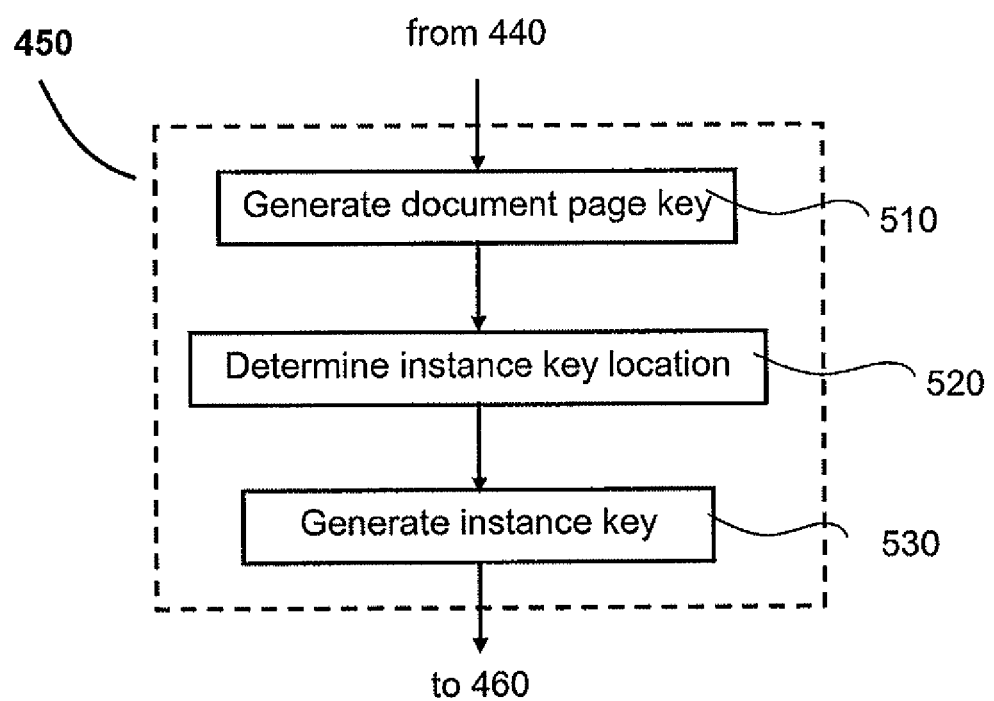
FIG. 5 shows a method of generating page keys from a scan of a printed page.
Figure 10:
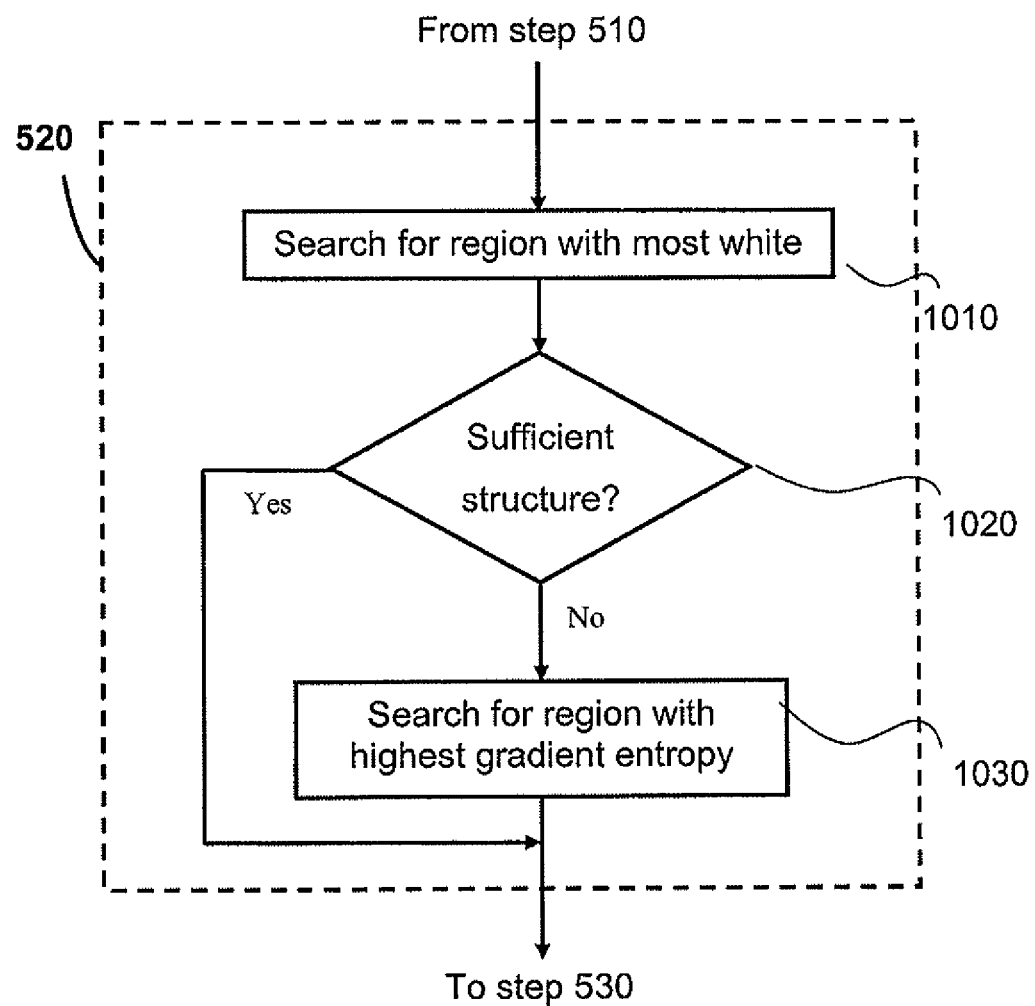
FIG. 10 is a block diagram showing a method of determining an instance key location from a scan.

Now the sub-method 520 of FIG. 5 is described in more detail with reference to FIG. 10. In general, determining where the instance key should be located on the page is done by finding the region of the scanned image with the highest luminance. This allows determining which area of the scanned image is mostly the medium on which the print has been made. Such areas tend to have a large amount of random structure generated by the fibres of the print medium. Checking the gradient entropy of this region then determines if there is sufficient structure in this region to ensure good discrimination between instance keys in the database. If there is not sufficient structure in the region, then a search is carried out to find the region with the most structure and that is used for the instance key location.

In the described embodiment, the instance key is based on a region of the scan of size 128×128, with a resolution of 300 dpi. With respect to FIG. 10, the first step 1010 in the sub-method 520 includes the processor 105 processing the data of the area of the 37.5 dpi document generated in step 810. The area is contained within the boundaries of the document, as determined in step 820. The aim of the data processing in step 1010 is to determine which 16×16 block has the highest average luminance value. In step 1020, the processor 105 calculates a measure of the gradient entropy of this block on corresponding pixels in the 300 dpi image by first generating x and y gradient images over the block using:

$$d_x(i,j) = Y(i,j) - Y(i-1,j)$$

$$d_y(i,j) = Y(i,j) - Y(i,j-1)$$

If the luminance data is in the range 0 to 255, then the derivatives must be between −255 and 255. Due to the downsampling of the 600 dpi scan to 300 dpi, the range of the derivatives tends to be much smaller than this. The gradient entropy measure is determined by forming two histograms of the x and y derivatives:

$$h_x(v) = \sum_{i,j} \delta(d_x(i,i) - v)$$

$$h_y(v) = \sum_{i,j} \delta(d_y(i,j) - v)$$

Normalising these forms probability distributions;

$$p_x(v) = \frac{h_x(v)}{\sum_v h_x(v)}$$

$$p_y(v) = \frac{h_y(v)}{\sum_v h_y(v)}$$

The combined Shannon entropy of the two one-dimensional histograms can now be calculated;

$$E = \sum_v p_x(v) \log p_x(v) + \sum_v p_y(v) \log p_y(v)$$

If the gradient entropy is larger than a fixed threshold, which in the described embodiment, is 3.0, then the corresponding region of the 300 dpi sub-sampled version of the scan is used as the instance key region. If the gradient entropy is not larger than the fixed threshold, then the processor 105 conducts a further search over the 37.5 dpi in step 1030 to determine which 16×16 block has the highest gradient entropy. The corresponding region of the 300 dpi sub-sampled version of the scan with the highest gradient entropy is used as the instance key region.

Figure 11:
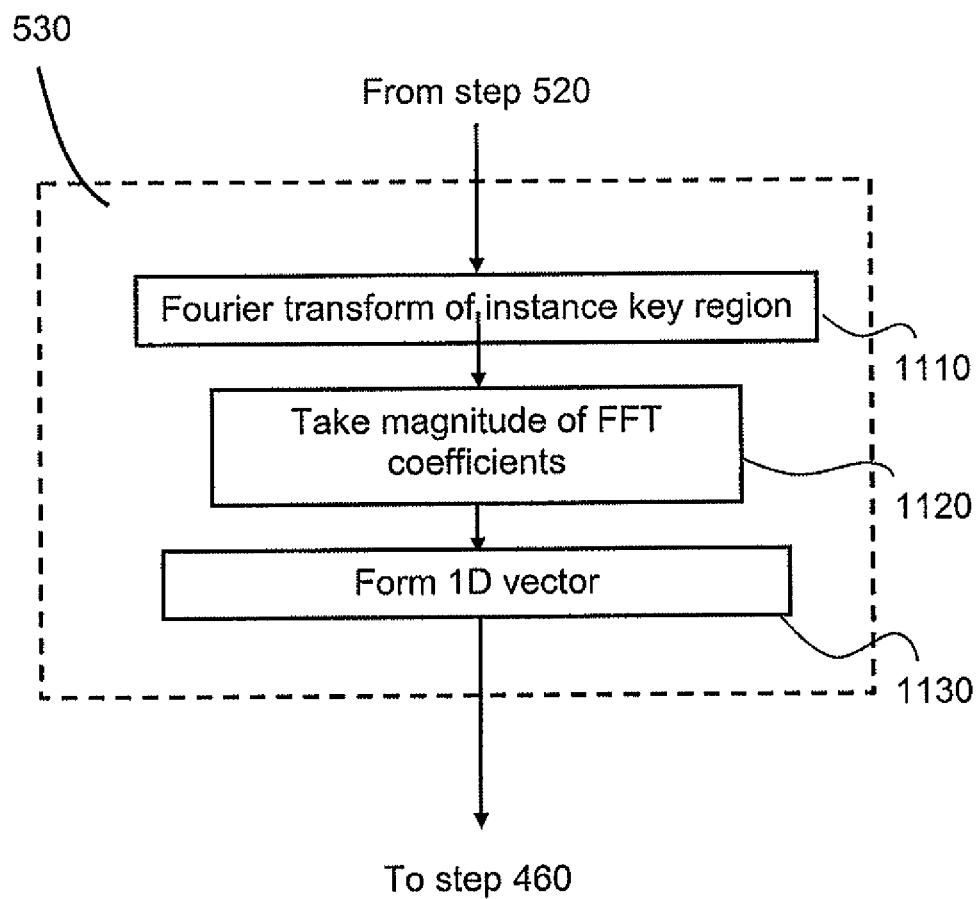
FIG. 11 is a block diagram showing a method of generating an instance key based on the instance key location on a scan.

The calculation of the instance key in sub-method 530 of FIG. 5 is now described in more detail with reference to FIG. 11. In the first step 1110 of this sub-method, the processor 105 effects a Discrete Fourier Transform of the 128×128 instance key region identified in sub-method 520 using the FFT. Next, in step 1120, the magnitude of the FFT is determined and the magnitude of the Fourier coefficients is taken. In step 1130, the processor 105 calculates a raster order of the magnitudes of the FFT coefficients to form a 1 dimensional vector that represents the instance key for this printed instance.

When two instance keys are of the type described above, a comparison between these keys, such as the one referred to in step 770, is effected in the following way. Let us denote the two instance keys as $K_i^{(1)}$ and $K_i^{(2)}$, where the index i enumerates over the 16384 elements of the instance key. Two keys are compared using normalised correlation:

$$C = \frac{\sum_i K_i^{(1)} K_i^{(2)}}{\sqrt{\sum_i K_i^{(1)2}} \sqrt{\sum_i K_i^{(2)2}}}$$

Two keys are considered a match if their normalised correlation is above a fixed threshold. In the described embodiment this threshold is 0.5.

The foregoing describes only some embodiments of the present invention, and modifications and/or changes can be made thereto without departing from the scope and spirit of the invention, the embodiments being illustrative and not restrictive.

In the preceding description, both the document page keys and the instance keys were generated from the Fourier magnitude of the scan data. Numerous other approaches and image transforms can also be used to generate such keys, such as wavelet transforms, Walsh-Hadamard transforms, Radon transforms and the like. Also, the described implementation determined the Fourier magnitudes using an FFT routine. In some implementations it may be preferable to calculate the Fourier coefficients directly in the spatial domain, particularly if the algorithm is embedded in a low-power computing device.

Another variation of the approach described above includes changing the resolution and sizes of the images that are being processed and the size of the stored document index keys. Also, the key comparison methods used above may be modified to use weighted sums of coefficients, or linear discriminant analysis, or principal component analysis to compress or speed up the comparison sets.

A further variation on the described embodiment is to generate the document page key and/or the instance key from full colour data instead of the Y colour component. This includes choosing a different one-dimensional subspace of the colour data, which is more discriminating for a given document. For instance one can calculate the principal components of the colours of a document and use the first principal component as the colour channel for the creation of the document page key.

Many other methods can also be used to choose which area of the document is to be used as the instance key. In the described embodiment, this area was chosen by either finding the highest luminance portion of the scan image or, if that was not bright enough, finding the area of the scan image with the largest gradient entropy. Other methods include evaluating the standard deviation of the image area, evaluating the image histogram entropy or evaluating the entropy of the image region projected onto random basis functions.

The present method has been described with reference to a single sided printing environment. However, the present method could also be practiced in a duplex printing environment by including a duplex scanner instead of a single scanner at the output stage of the printer. Similarly, the described embodiment did not take into account the ability of modem printers to dynamically change the formatting of documents before printing, printing two-up or in landscape mode instead of portrait mode according to settings in the printer driver. However, the current method can also be practiced in these systems with only minor modifications to the document database to allow for multiple document pages to be associated with a single printed instance.

Finally, the present method was described with reference to a digital photocopier system. It is equally feasible to use other multifunction devices, such as integrated inkjet multi-function printers, or to implement the described method in a system where the printer and the output scanner are physically distinct devices.

INDUSTRIAL APPLICABILITY

The described method is applicable to the printing, imaging, data management and data processing industries.

What is claimed is:

1. A computer implemented method of identifying a printed instance of a source document from a scan of a printed page, the method being executed by a processor with at least a database, and comprising:
    generating a page key of the printed page on the basis of the scan;
    sending the generated page key to the database to initiate a search for a similar page key; and
    for each similar page key found by the search:
        retrieving from the database an instance key location for a page instance with the respective similar page key;
        generating an instance key for the printed page, based on the retrieved instance key location of the respective page instance, the instance key being substantially variant between different printed instances of a source document; and
        sending the generated instance key for the printed page to the database for a comparison with an instance key of the respective page instance,
    wherein a match between the instance keys indicates that the printed page is the respective page instance of the source document.

2. The method of claim 1, wherein the page key is associated with an image content of the printed page.

3. The method of claim 1, wherein the page key is associated with a logical content of the printed page.

4. The method of claim 1, wherein said instance key is associated with a physical characteristic generated by the printing process.

5. The method of claim 1, wherein said instance key is a characteristic of a physical medium of the printed page.

6. The method of claim 1, further comprising retrieving metadata for the respective page instance with a matching instance key.

7. A computer implemented method for identifying a printed instance of a source document from a scan of a printed page, the print being effected by a printing device on a physical medium, the method being performed by a processor in association with a database, the method comprising the steps of:
    finding at least one image in the database that is similar to a scanned image of the printed page obtained from the scan, the similarity being based on a first physical characteristic captured in said scanned image, said characteristic being substantially invariant between different printed instances of said source document; and
    for each of the at least one similar images:
        determining a location in the scanned image based on information associated with the respective similar image;
        obtaining a second characteristic from said scanned image, said second characteristic being positioned in said location, wherein said second characteristic is substantially variant between different instances of said source document; and
        comparing the second characteristic of the scanned image with a corresponding second characteristics of the respective similar image,
    wherein a match between the second characteristics indicates that the respective similar image is a source document for the printed page.

8. The method of claim 7, wherein said second characteristic is associated with the printing of the printed page by the printing device on the physical medium.

9. The method of claim 7, wherein said second characteristic is a characteristic of said physical medium.

10. The method of claim 7, further comprising retrieving metadata for the source document with a matching instance key.

11. A method of identifying a printed instance of a source document from an unidentified printed page, the method comprising the steps of:

scanning a plurality of first printed pages to generate a first scan of each first printed page;

generating a page key and an instance key for each first printed page on the basis of its respective first scan, at least the instance key being substantially variant between different printed instances of the same source document;

storing the generated page key and an instance key for each first page in a database;

scanning the unidentified printed page to generate a scan of the unidentified page;

on the basis of the scan of the unidentified page, generating a page key of the unidentified printed page;

sending the generated page key to the database to initiate a search for a similar page key to the page key of the unidentified page; and for each similar page key found by the search:
  retrieving from the database an instance key location for a first page with the respective similar page key;
  generating an instance key for the unidentified printed page, based on the retrieved instance key location of the respective first page, the instance key being substantially variant between different printed instances of a source document; and
  sending the generated instance key for the unidentified printed page to the database for comparison with an instance key of the respective first page, wherein a match between the instance keys indicates that the unidentified printed page is identical to the respective first printed page.

12. The method of claim 11, wherein the instance key is selected to be in a location of the page with the highest average luminance value.

13. The method of claim 11, wherein the instance key is selected to be in a location of the page with the highest gradient entropy.

14. The method of claim 11, wherein the page key is associated with an image content of the printed page.

15. The method of claim 11, wherein the page key is associated with a logical content of the printed page.

16. The method of claim 11, wherein said instance key is associated with a physical characteristic generated by the printing process.

17. The method of claim 11, wherein said instance key is a characteristic of a physical medium of the printed page.

18. The method of claim 11, further comprising retrieving metadata for the respective first page with a matching instance key.

19. A system for identifying a printed instance of a source document from a scan of a printed page, said system comprising:

an interface for:
  receiving the scan of the printed page;
  accessing a database; and
  communicating with imaging means; and a processor for:
  generating a page key of the printed page on the basis of the received scan;
  sending the generated page key to a database to initiate a search for a similar page key; and
  for each similar page key found by the search;
    retrieving from the database an instance key location for a page instance with the respective similar page key;
    using the imaging means for generating an instance key for the printed page, based on the retrieved instance key location of the respective page instance, the instance key being substantially variant between different printed instances of a source document; and
    effecting the sending of the generated instance key for the printed page to the database for comparison with an instance key of the respective page instance, wherein a match between the instance keys indicates that the printed page is the respective page instance of the source document.

20. A non-transitory computer readable storage medium having a computer program recorded thereon, the program being executable by a computer system to make the computer system identify a printed instance of a source document from a scan of a printed page, said program comprising:

code for generating a page key of the printed page on the basis of the scan;

code for sending the generated page key to a database to initiate a search for a similar page key; and code for effecting, for each similar page key found by the search:
  retrieval from the database an instance key location for a page instance with the respective similar page key;
  generation of an instance key for the printed page, based on the retrieved instance key location, the instance key being substantially variant between different printed instances of a source document; and
  sending the generated instance key for the printed page to the database for comparison with an instance key of the respective page instance, wherein a match between the instance keys indicates that the printed page is the page instance of the source document.

* * * * *